United States Patent
Dao et al.

[19]
[11] Patent Number: 6,148,395
[45] Date of Patent: Nov. 14, 2000

[54] SHARED FLOATING-POINT UNIT IN A SINGLE CHIP MULTIPROCESSOR

[75] Inventors: Tuan Q. Dao; Donald E. Steiss, both of Richardson, Tex.

[73] Assignee: Texas Instruments Incorporated, Dallas, Tex.

[21] Appl. No.: 08/856,645

[22] Filed: May 15, 1997

Related U.S. Application Data

[60] Provisional application No. 60/017,459, May 17, 1996.

[51] Int. Cl.$^7$ ........................................... G06F 9/00
[52] U.S. Cl. .................. 712/222; 712/220; 712/221; 712/23
[58] Field of Search ............................. 712/32, 208, 207, 712/220, 222, 221, 23; 345/501, 519

[56] References Cited

U.S. PATENT DOCUMENTS

| | | | |
|---|---|---|---|
| 5,598,546 | 1/1997 | Blomgren | 712/209 |
| 5,673,407 | 9/1997 | Poland et al. | 712/222 |
| 5,732,209 | 3/1998 | Vigil et al. | 714/30 |
| 5,828,578 | 10/1998 | Blomgren | 364/488 |

*Primary Examiner*—Meng-Ai T. An
*Assistant Examiner*—Nabil El-Hady
*Attorney, Agent, or Firm*—Robert D. Marshall, Jr.; W. James Brady, III; Frederick J. Telecky, Jr.

[57] ABSTRACT

A single-chip multiprocessor (2, 102) is disclosed. The multiprocessor (2, 102) includes multiple central processing units, or CPUs, (10, 110) that share a floating-point unit (5, 105). The floating-point unit (5, 105) may receive floating-point instruction codes from either or both of the multiple CPUs (10, 110) in the multiprocessor (2, 102), and includes circuitry (52) for decoding the floating-point instructions for execution by its execution circuitry (65). A dispatch unit (56) in the floating-point unit (5, 105) performs arbitration between floating-point instructions if more than one of the CPUs (10, 110) is forwarding instructions to the floating-point unit (5, 105) at the same time. Dedicated register banks, preferably in the form of stacks (60), are provided in the floating-point unit (5, 105). The disclosed multiprocessor (2, 102) provides efficiency in allowing sharing of the floating-point unit (5, 105) by the multiple CPUs (10, 110), considering that the utilization of a floating-point unit (5,105) by a single CPU (10, 110) is generally relatively low.

5 Claims, 6 Drawing Sheets

SHARED FLOATING-POINT UNIT IN A SINGLE CHIP MULTIPROCESSOR

This application claims priority under 35 USC 119(e) (1) of the provisional application Ser. No. 60/017,459, filed May 17, 1996.

This invention is in the field of microprocessors, and is more specifically directed to single-chip multiprocessor integrated circuits.

BACKGROUND OF THE INVENTION

In the field of data processing systems and circuits, parallel processing refers to the simultaneous use of multiple data processing circuits, such as microprocessor central processing units (CPUs), to perform a single computer program. In this arrangement, the multiple CPUs execute program instructions in parallel, under certain constraints relative to the order of operations and use of shared resources. The theoretical performance of a parallel processing system thus can be much higher than that of systems having a single CPU. Supercomputers having many parallel processors (e.g., up to on the order of 256 or more processors) are known in the art.

Many of the known parallel processing systems are arranged using multiple microprocessor integrated circuits, with each integrated circuit having a single CPU. It is contemplated, however, that future parallel processing systems will be implemented, at least in part, by single-chip microprocessor integrated circuits that have multiple CPUs implemented therewithin.

The benefits of parallel processing have been achieved, in part, in modern single chip microprocessors of the so-called "superscalar" architecture. For example, microprocessors of the well-known x86-architecture, particularly those compatible with and having the capability of the PENTIUM microprocessor available from Intel Corporation, are considered to be superscalar. Superscalar microprocessors include at least two instruction pipelines that can operate in parallel, under certain constraints upon the types of parallel instructions (considering the available processor resources). A two-pipeline superscalar microprocessor is thus able to execute up to two multiple-cycle instructions in each machine cycle.

Typical modern microprocessors also include on-chip floating-point units (FPUs) that perform arithmetic operations on floating-point data operands. As is fundamental in the art, floating-point data operands are digital data words that have both a mantissa and an exponent portion, for representing non-integer numbers. Typically, as in the case of 486-class microprocessors, the FPU is implemented in a microprocessor as a separate execution unit, having its own instruction pipeline, such that floating-point instructions are forwarded to the FPU for decoding and execution, in similar fashion as if it were located on a separate integrated circuit. In the case of the PENTIUM microprocessor, which is superscalar in the sense that it has two integer pipelines, the floating-point pipeline is shared with one of the integer pipelines through the integer execution and integer writeback stages, with the floating-point execution stages being added to the length of that integer pipeline.

As is well known in the art, the FPU of a modern microprocessor is a relatively complex circuit, and requires a significant portion of the integrated circuit chip area for its realization. According to conventional techniques, therefore, the implementation of multiple CPUs, each having their own dedicated FPU, onto a single integrated circuit chip, will require an extremely large chip size. This large chip size translates, of course, into both low manufacturing yields and also high per-chip manufacturing cost.

SUMMARY OF THE INVENTION

The invention may be implemented into a single-chip microprocessor integrated circuit having multiple integer central processing units (CPUs) sharing a floating-point unit (FPU). The shared FPU provides a register file, such as a stack, corresponding to each of the CPUs; in addition, the shared FPU has input instruction buffers for receiving instructions from each of the CPUs. The shared FPU has one execution pipeline that performs floating-point operations upon operands received from any one of the multiple CPUs, according to instructions received from the associated CPU. Dispatch circuitry is provided to detect and resolve conflicts among the multiple CPUs in their use of the shared FPU.

It is therefore an object of the present invention to provide a parallel processing microprocessor architecture that allows for a floating-point unit to be shared among multiple integer central processing units on the same integrated circuit.

It is a further object of the present invention to reduce the integrated circuit chip area required to implement a high performance parallel processing microprocessor, by sharing the floating-point unit.

It is a further object of the present invention to obtain the benefit of parallel processing with reduced chip area, considering the duty cycle with which parallel integer processors use the floating-point unit.

Other objects and advantages of the present invention will be apparent to those of ordinary skill in the art having reference to the following specification together with its drawings.

DETAILED DESCRIPTION OF THE PREFERRED EMBODIMENT

Figure 1:
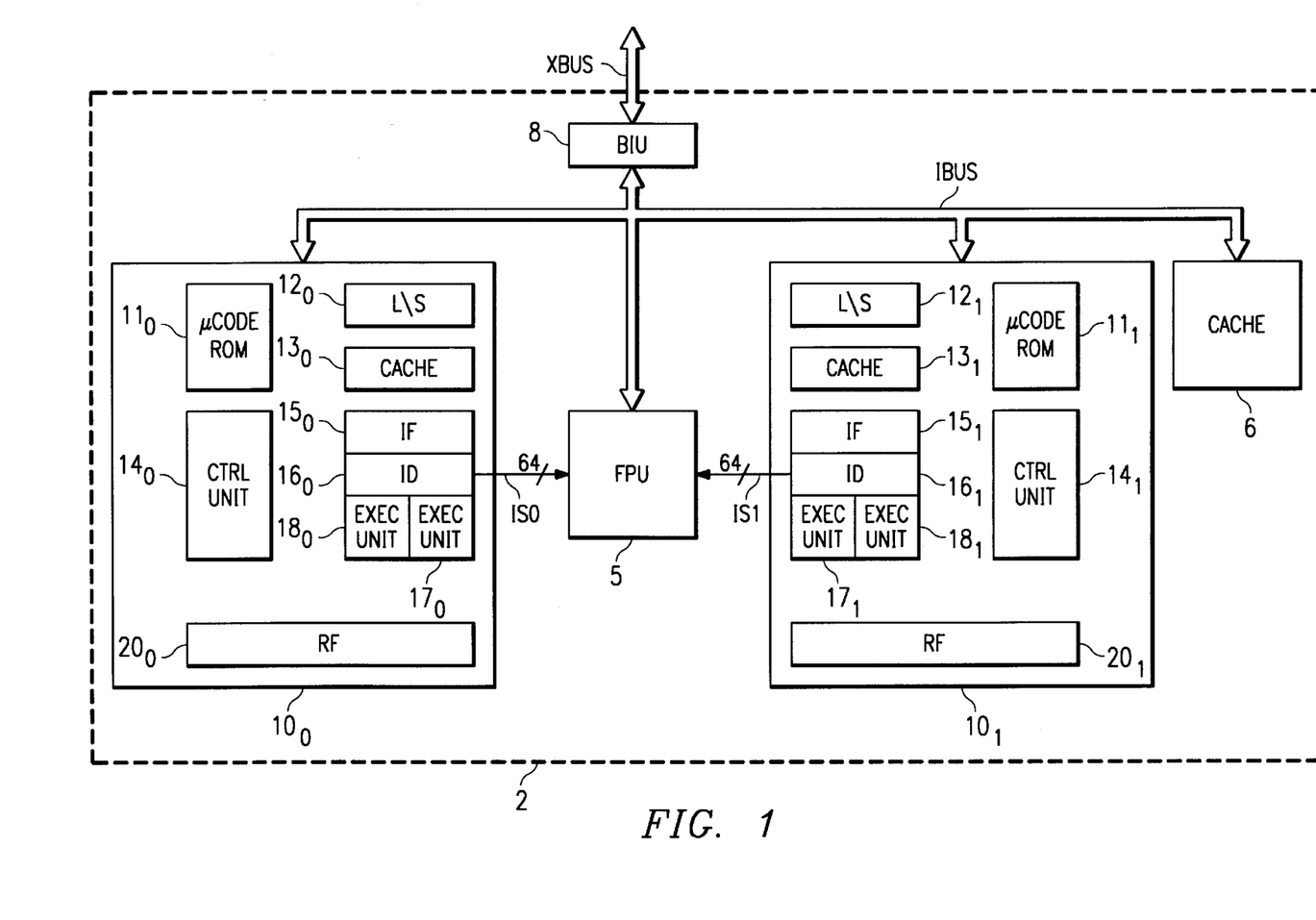
FIG. 1 is an electrical diagram, in block form, of a single-chip multiprocessor according to a first preferred embodiment of the invention.

Referring first to FIG. 1, single-chip multiprocessor 2 according to the preferred embodiment of the invention will now be described in detail. For purposes of this description, the term "single-chip multiprocessor" is intended to refer to a single integrated circuit chip upon which two or more microprocessor central processing units, or CPUs, are implemented. In this example, multiprocessor 2 includes two x86 architecture superscalar CPUs, $10_0$, $10_1$, each capable of executing sequences of program instructions independently from one another (subject to memory and other resource constraints, as are known in the art). As will be evident from the following description, the present invention may be applicable to single-chip multiprocessor arrangements including more than two CPUs, and including CPUs of architecture types other than the well-known x86 architecture.

Multiprocessor 2 is in communication with an external bus XBUS by way of bus interface unit (BIU) 8. External bus XBUS is connected to system memory, disk storage devices, input/output devices, and other conventional subsystems typical in conventional personal computers and workstations. External bus XBUS thus is capable of communicating address, data, and control signals between multiprocessor 2 and such other subsystems in the conventional manner. Of course, other buses external to multiprocessor 2 may also be provided, examples of which include the well-known PCI local bus. BIU 8 is connected to internal bus IBUS, which is a bus for communicating address, data, and control signals among the various constituent blocks of multiprocessor 2, including CPUs $10_0$, $10_1$. Multiprocessor 2 according to this embodiment of the invention includes shared floating-point unit (FPU) 5, the construction of which will be described in further detail hereinbelow, and cache memory 6, each of which are connected to internal bus IBUS. Cache 6 is an on-chip cache memory, either having dedicated data and instruction portions or instead being a unified cache, for locally storing data and instructions that are either recently used or likely to be used in the particular instruction sequences being executed by multiprocessor 2; data and address information will be communicated to and from cache 6 on internal bus IBUS, as shown in FIG. 1.

General control and timing logic is also included within multiprocessor 2, but is not shown in FIG. 1 for purposes of clarity. Such general control and timing logic will include logic for generating the clock signals within multiprocessor 2, responsive to which synchronous operation may be performed. Such logic will also maintain general control of multiprocessor 2, including arbitration for traffic upon internal bus IBUS and for the use of certain shared resources, and will update status information regarding the current state of the device.

Each CPU 10 includes various functional circuitry of the x86 architecture type to perform a sequence of data processing instructions. Load/store units 12 are included within CPU 10 to control memory access by its associated CPU 10. In addition, each CPU 10 may include its own cache memory 13, for storing either or both data and instructions for the current operation. In this exemplary embodiment, instruction fetch circuitry 15 and instruction decoder 16 support multiple integer instruction pipelines. Instruction decoder 16, in each CPU 10, decodes the instruction fetched by fetch circuitry 15 from cache 13 or elsewhere into control signals communicated to and applied by control unit 14 to control the operation of CPU 10.

As noted above, each CPU 10 is of the superscalar type, and as such is capable of issuing and executing multiple instructions in parallel, absent resource conflicts or data dependencies. In this example, each x86-architecture CPU 10 includes two integer execution units 17, 18, each of which include circuitry for performing operand fetch, execution, and writeback operations by way of one or more ALUs, and also by way of load/store units 12. As such, each CPU 10 effectively has two integer instruction pipelines. Each CPU 10 includes its own register file 20, which includes the usual named x86 architecture registers for retaining data, control, and status information. According to this exemplary implementation, therefore, up to two instructions per machine cycle may be executed by each CPU 10.

It is of course contemplated that the preferred embodiment of the invention is applicable to CPUs 10 having different levels of parallel pipelines, including scalar CPUs (i.e., a single pipeline per CPU), and superscalar CPUs of greater degree (e.g., microprocessors having up to as many as four parallel execution pipelines). It is therefore to be understood that the dual pipeline superscalar arrangement of CPUs 10 in this embodiment of the invention is presented merely by way of example.

It has been discovered, in connection with the present invention, that the on-chip floating-point unit of a conventional single-CPU microprocessor is utilized only for a relatively fraction of the time. In other words, the high-performance FPU in a modern microprocessor, for example of the PENTIUM class, is idle much of the time. According to the present invention, multiple CPUs on the same integrated circuit chip should therefore be able to share a single high-performance FPU without significant degradation in overall multiprocessor performance, while saving the chip area that would otherwise be required to provide a dedicated FPU, even of modest capability, for each CPU in the multiprocessor. The incorporation of a shared FPU into a single-chip multiprocessor according to the present invention is therefore advantageous, especially considering that the control circuitry required to implement the sharing is less than the area that would be required to implement dedicated a per-CPU floating-point unit.

Figure 2:
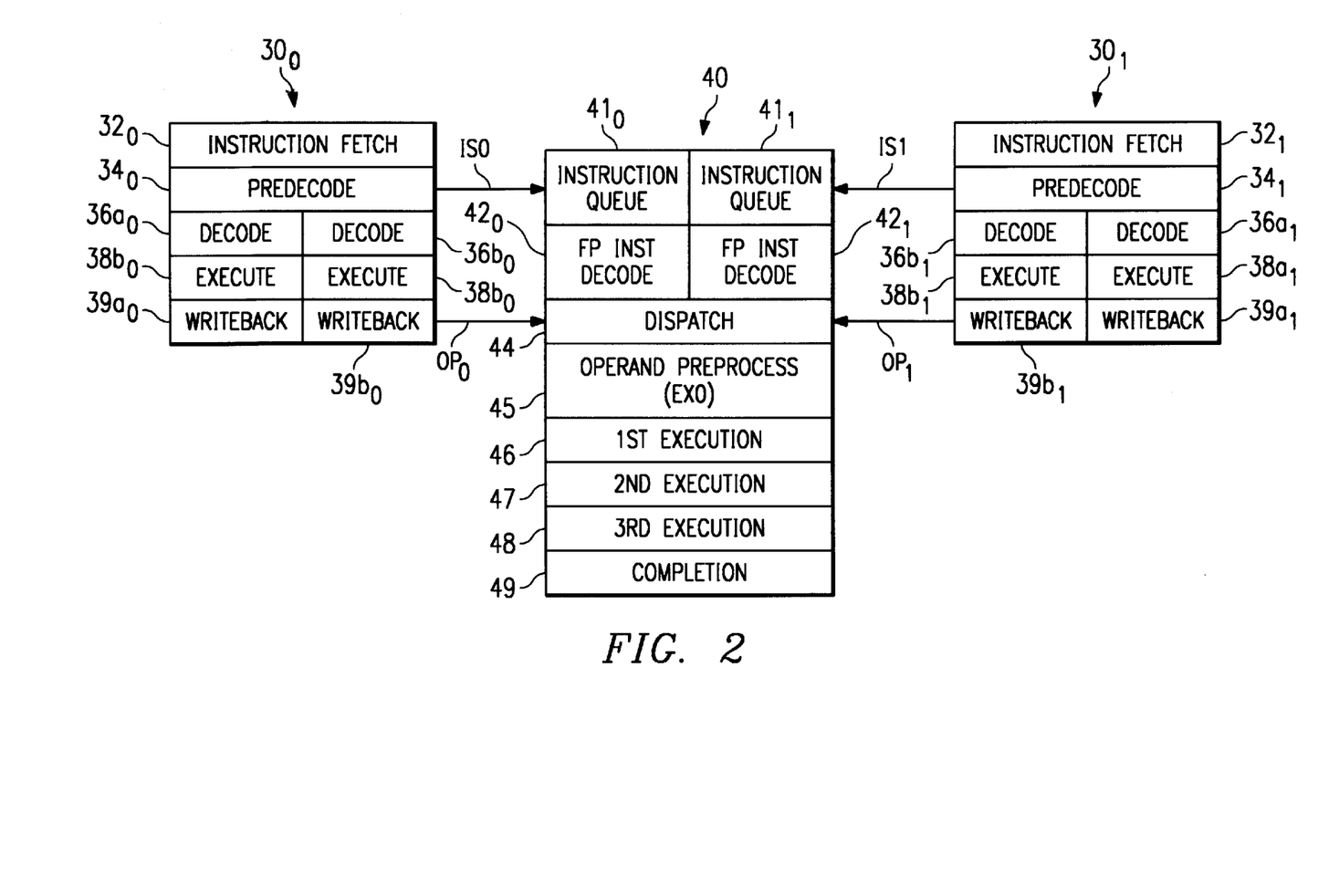
FIG. 2 is a flow diagram illustrating the sharing of pipeline stages by the floating-point unit in the first preferred embodiment of the invention.

Referring back to FIG. 1, this sharing of a single FPU 5 by multiple CPUs 10 according to a first preferred embodiment of the invention will now be described. In this embodiment of the invention, execution units $17_0$, $17_1$ of CPUs $10_0$, $10_1$, respectively, are in communication with shared FPU 5, while execution units $18_0$, $18_1$ are not. In effect, FPU 5 shares portions of the integer pipelines corresponding to execution units $17_0$, $17_1$ in both CPUs $10_0$, $10_1$, similarly as does the floating-point unit in a single CPU microprocessor of the PENTIUM type. Referring now to FIG. 2, this sharing is illustrated relative to a pipeline diagram.

As shown in FIG. 2, shared FPU 5 operates according to instruction pipeline 40 that shares its initial stages with superscalar integer pipelines $30_0$, $30_1$ of CPUs $10_0$, $10_1$. Superscalar integer pipeline $30_0$ (corresponding to CPU $10_0$) will now be described in detail, with the understanding that pipeline $30_1$ (corresponding to CPU $10_1$) operates similarly. The first stage of pipeline $30_0$ is instruction fetch stage $32_0$, in which instruction fetch circuitry $15_0$ fetches the next instruction to be decoded and executed (by each of the integer pipelines) from memory. The instruction fetch of stage $32_0$ is preferably made from one of on-chip cache memories 6, $13_0$, if the next instruction is available therein; otherwise, the instruction is fetched from main memory via BIU 8 and external bus XBUS. Predecode stage $34_0$ is next performed by instruction decoder $16_0$ to at least partially decode the instructions fetched in stage $32_0$. The decoded instructions are then sent to the pair of integer pipelines corresponding to execution units $17_0$, $18_0$ for further decoding and processing.

As noted above, according to this example, shared FPU 5 operates in conjunction with only one of the two execution pipelines in superscalar pipeline $30_0$ of CPU $10_0$, but not with the other. In the example of FIG. 2, therefore, execution unit $18_0$ thus is available only to execute non-floating-point operations. In the integer pipeline corresponding to execution unit $18_0$, decode second stage $36a_0$ is first performed to further decode the instruction, retrieve the appropriate operands, and to issue the instruction to execution stage $38a_0$. Execution stage $38a_0$ operates in conjunction with one or more integer arithmetic logic units to perform the arithmetic or logical operation specified by the current instruction; the results of execution stage $38a_0$ are then written back to the appropriate register in register file $20_0$ or to memory, as the case may be, in writeback stage $39a_0$. The integer pipeline corresponding to execution unit $17_0$, including decode second stage $36b_0$, execute stage $38b_0$, and writeback stage $39b_0$, similarly operates upon non-floating-point instructions detected by predecode stage $34_0$.

Accordingly, the two integer execution pipelines of CPU $10_0$ share initial pipeline stages (e.g., instruction fetch stage $32_0$ and predecode stage $34_0$), but have separate stages for the remainder of their operation. As such, two integer-based instructions may be performed substantially in parallel by execution units $17_0$, $18_0$ of CPU $10_0$, subject to certain instruction pairing constraints, such as data dependencies and resource conflicts.

As noted above, CPU $10_1$ operates according to superscalar pipeline $30_1$, in similar fashion as superscalar pipeline $30_0$ of CPU $10_0$.

Floating-point pipeline 40 of FIG. 2 corresponds to the general sequence of operation of shared FPU 5 in cooperation with CPUs $10_0$, $10_1$. The first stage of floating-point pipeline 40 is performed simultaneously for floating-point instructions detected by instruction decoders $16_0$, $16_1$, in their respective integer predecode stages $34_0$, $34_1$. As such, instruction queue stage $41_0$ receives a series of instruction codes for floating-point instructions detected in predecode stage $34_0$, while instruction queue stage $41_1$ receives a series of instruction codes for floating-point instructions detected in predecode stage $34_1$. It is preferred that multiple floating-point instructions are queued in stages 41; for example, in the case of floating-point pipeline 40 of FIG. 2 where the maximum instruction latency within the pipeline is four instructions, the preferred depth of instructions in queue stages 41 is five instructions. Each sequence of floating-point instructions are then decoded, in FIFO order, in decode stages $42_0$, $42_1$, of floating-point pipeline 40; as indicated in FIG. 2, these stages may be performed simultaneously and in parallel for instructions from each CPU 10.

The next floating-point pipeline stage is dispatch stage 44. Dispatch stage 44 is performed by control circuitry in CPU 5, as will be described hereinbelow, to detect potential conflicts arising from floating-point instructions provided by CPUs 10, and to select and issue the appropriate instruction to the execution stages of the pipeline. Dispatch stage 44 will also effect arbitration between instruction sequences from CPUs $10_0$, $10_1$ in the event of simultaneous floating-point requests. Upon selection of a floating-point instruction sequence and at such time as dependencies are clear, dispatch stage 44 of floating-point pipeline 40 receives operands from the writeback pipeline stage 39b associated with the one of CPUs $10_0$, $10_1$ whose floating-point instruction is to be issued by dispatch stage 44. The communication of operands are illustrated in FIG. 2 by flow arrows $OP_0$, $OP_1$ from pipelines $30_0$, $30_1$, respectively.

It should be noted that floating-point pipeline stages 41, 42, 44 may be, and preferably are, performed in parallel with predecode, decode, and execute stages 34b, 36b, 38b in superscalar integer pipelines 30.

The selected floating-point instruction is then issued by dispatch stage 44 to the execution stages of floating-point pipeline 40. In this example, operand preprocessing stage 45 is first performed, to format the operands received in dispatch stage 44 (and also operands in the internal registers or on the writeback bus of shared FPU 5 itself) for application to the execution circuitry. Special case operands (such as NaN, infinity, exact zero, and denormalized values) are also identified and handled by operand preprocess stage 45. In this example, three execution stages 46, 47, 48 are included within floating-point pipeline 40, indicating that the floating-point arithmetic instructions may require up to three cycles to execute; of course, single-cycle instructions (such as change sign) may also be performed, in which case certain of execution stages 46, 47, 48 may be skipped. Completion stage 49 is the final stage of floating-point pipeline 40, in which the results of the instruction are written back to the appropriate destination location, and in which any execution exceptions or errors are identified and communicated to the appropriate resource.

Figure 3:
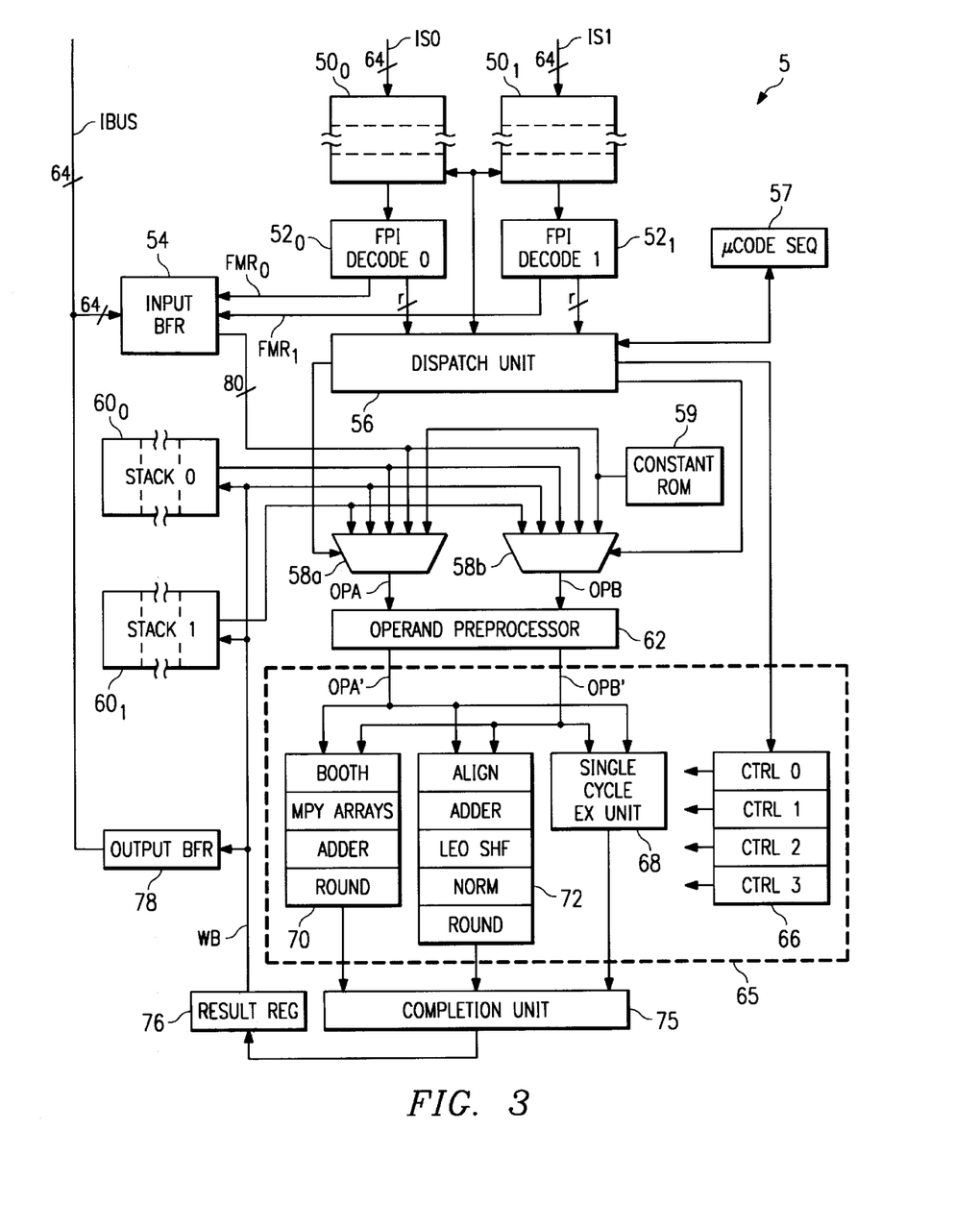
FIG. 3 is an electrical diagram, in block form, of a shared floating-point unit as incorporated into the multiprocessor of FIG. 1.

Referring now to FIG. 3, the construction of shared FPU 5 of multiprocessor 2, which in this embodiment of the invention is operable according to the pipeline flow of FIG. 2, will now be described in detail.

As shown in FIG. 3, shared FPU 5 includes two multistage instruction buffers $50_0$, $50_1$ that receive instruction codes from instruction decoders $16_0$, $16_1$ of CPUs $10_0$, $10_1$, respectively. As noted above relative to the description of queue stages 41 in floating-point pipeline 40, instruction buffers 50 are preferably arranged in a FIFO manner, having a number of stages equal to the maximum instruction latency of shared FPU 5, plus one. In this example, each of instruction buffers 50 have five stages, and thus can hold five instruction codes, given that the maximum instruction latency of shared FPU is four instructions (operand preprocess stage 45 plus the three execution stages 46, 47, 48). Each stage of instruction buffers 50 is preferably able to store an entire instruction code for a floating-point instruction which, in this case of x86-architecture CPUs 10, may include up to eight bytes (one for the tag, and up to seven bytes for the instruction code with identifiers for source and destination operand locations).

Shared CPU 5 also includes floating-point instruction decoders $52_0$, $52_1$ associated with a corresponding instruction buffer $50_0$, $50_1$. Floating-point instruction decoders 52 each receive the oldest instruction from their respective instruction buffers 50, and decode it into control signals for application within shared FPU 5; the control signals are applied, simultaneously from both instruction decoders $52_0$, $52_1$ to dispatch unit 56 in shared FPU 5. Floating-point instruction decoders 50 also control the receipt of input operand data from internal bus IBUS via input buffer 54. In this example, input buffer 54 is preferably an eighty-bit register for storing a floating-point data word presented thereto via internal bus IBUS. However, since internal bus IBUS is only sixty-four bits wide in this example, multiple loads of data from internal bus IBUS into input buffer 54 are required. Floating-point instruction decoders 56 are each capable of controlling input buffer 54 to receive additional data from internal bus IBUS if necessary to fill input buffer 54; such control is effected by each of instruction decoders 52 by way of lines $FMR_0$, $FMR_1$ shown in FIG. 3. Accordingly, fetching of extended precision floating-point operands by shared FPU 5 is effected by one of floating-point instruction decoders 52 controlling input buffer 54 to receive a first portion of the operand in a first cycle and, via asserting a signal on the corresponding FMR line, fetch the remainder of the extended precision operand in the next cycle.

As evident from the foregoing description, shared FPU 5 includes both an instruction buffer 50 and a floating-point instruction decoder 52 for each of the CPUs 10 that share FPU 5. As such, receipt and queuing of floating-point instructions and decoding of these instructions may be performed by shared FPU 5 in parallel, as described hereinabove relative to FIG. 2. In this embodiment of the invention, dispatch unit 56, which receives control signals from each of floating-point instruction decoders 52, determines which of the floating-point instructions decoded by decoders 52 shall next be issued to the execution circuitry of FPU 5, as will now be described. It is contemplated that one of ordinary skill in the art, having reference to this description, will be able to readily implement the logic required for dispatch unit 56 based upon the functions now to be described therefor.

Dispatch unit 56 is constructed of logic suitable for performing the functions of receiving control signals from floating-point instruction decoders 52 that are derived from floating-point instructions, and for launching, or issuing, the appropriate instruction to the execution circuitry of shared FPU 5, along with the appropriate operands; as such, dispatch unit 56 performs the functions described hereinabove for dispatch stage 44 of shared floating-point pipeline 40. Dispatch unit 56 also receives control signals from instruction buffers 50, upon which are communicated signals indicating the full or empty state of instruction buffers 50, for use by dispatch unit in a priority determination. Based upon the control signals received from instruction decoders 52 and from instruction buffers 50, dispatch unit 56 first determines if floating-point instructions have been decoded by more than one of instruction decoders 52. If so, dispatch unit 56 will select which of the multiple instructions (i.e., which of CPUs 10) has the higher priority, according to a predetermined arbitration scheme such as round-robin, fixed order, or instruction-dependent.

For either a single floating-point instruction or for the selected one of the multiple floating-point instructions, dispatch unit 56 next determines if any dependencies are presented by the selected instruction relative to those instructions that are in execution. If so, the floating-point pipeline is stalled until completion of an earlier instruction, or other action is taken in order to avoid the problem of the dependency. Dispatch unit 56 also interrogates the instruction to determine if it is a microcoded instruction, in which case dispatch unit 56 will forward the appropriate identifier to microcode sequencer 57 which, in turn, will present the appropriate control signals corresponding to the microcoded instruction to dispatch unit 56.

Dispatch unit 56 is also responsible for selecting the appropriate sources for the two operands (OPA, OPB) to be applied to the execution circuitry. In this embodiment of the invention, multiplexer 58a selects the appropriate source for operand OPA and multiplexer 58b selects the appropriate source for operand OPB, each according to control signals generated by dispatch unit 56. Each of multiplexers 58a, 58b receive data retrieved from memory and communicated on internal bus IBUS as an eighty-bit input from input buffer 54 for use as operands OPA, OPB, respectively. Constant ROM 59 is provided in shared FPU 5 to store floating-point representations of commonly used numbers such as $\pi$, e, $\sqrt{2}$, and the like; the ROM address for the desired constant stored in constant ROM is presented by dispatch unit 56 responsive to the decoded selected floating-point instruction. Also according to this embodiment of the invention, the results of previously executed instructions are presented on writeback bus WB and applied to the inputs of multiplexers 58 for potential use as floating-point operands, so as to provide operand forwarding without requiring storage of the result in an additional register.

According to this embodiment of the invention, shared FPU 5 includes dedicated register banks for each CPU 10. In this example, the register banks are implemented as stacks $60_0$, $60_1$, dedicated for CPUs $10_0$, $10_1$, respectively, considering that floating-point registers in conventional x86-architecture microprocessors are implemented as stacks. In this example, stacks $60_0$, $60_1$ each include eight register locations, each capable of storing a floating-point data word (in the maximum available precision), and also the necessary support registers such as a stack pointer and the like. Each of stacks $60_0$, $60_1$ have outputs for presenting a floating-point data word to each of multiplexers 58a, 58b for use as input operands OPA, OPB, depending upon the floating-point instruction to be launched. Since the floating-point instruction itself will not refer to a selected one of stacks 60, but since the proper stack 60 will be implicit in the one of CPUs 10 from which the current floating-point instruction was forwarded, dispatch unit 56 must maintain CPU identity for the instruction to be launched.

Of course, the dedicated register banks may be implemented in other ways, such as by way of multiple named registers, depending upon the particular FPU architecture and instruction set.

Dispatch unit 56 launches an instruction by controlling multiplexers 58 to select the appropriate operands for use as operands OPA, OPB in the execution of the floating-point instruction, and by sending the appropriate control signals for that instruction to control stage 0 of control pipeline 66. Control pipeline 66 is a pipeline of control circuitry that produces the appropriate control signals to be applied to the execution circuitry in FPU 5 for the instructions in the pipeline. Referring back to FIG. 2, since four execution stages 45, 46, 47, 48 are used in shared FPU 5 according to this embodiment of the invention, control pipeline 66 includes four stages, as shown in FIG. 3.

The execution of the launched instruction is initiated by operand preprocessor 62, which reformats operands OPA, OPB as necessary. For example, shared FPU 5 may utilize an internal format of higher complexity than extended precision (or whatever is the highest precision level externally from FPU 5), so as to maintain improved resolution for intermediate results of a multipass floating-point operation. If such is the case, operand preprocessor 62 receives operands OPA, OPB from multiplexers 58 and reformats them into the internal format (operands OPA', OPB'). In addition, operand preprocessor 62 also examines operands OPA, OPB for special cases, such as not-a-number (NaN), infinity, exact zero, and the like, and presents an corresponding special value as operand OPA' or OPB' at its outputs. This operation of operand preprocessor 62, which occurs in $0^{th}$ execution stage 45 (FIG. 2), is controlled by control signals from the corresponding stage of control pipeline 66.

Operands OPA', OPB' are then presented to execution circuitry 65 of shared FPU 5 so that the appropriate arithmetic or logic operation may be performed. Execution circuitry 65 of FPU 5 may be implemented in any conventional manner for performing floating-point operations. In this example, execution circuitry 65 is implemented in three paths, each of which receives operands OPA', OPB' from operand preprocessor 62. The one of these multiple paths which is to perform the operation is selected and enabled by the corresponding stages of control pipeline 66.

In this example, a first path of execution circuitry 65 is multiplication circuitry 70, for performing floating-point multiplication and division operations. Multiplication circuitry 70 may include a sequence of circuitry known in the art, such as a Booth recorder, multiplier arrays, an adder, and rounding circuitry. In this particular example, multiplication circuitry 70 provides a result in three machine cycles, and thus operates according to the three execution stages 46, 47, 48 of floating-point pipeline 40, each stage under the control of a corresponding stage in control pipeline 66. The output of the rounding circuitry in multiplication circuitry 70 is presented to completion unit 75.

A second path of execution circuitry 65 is implemented as adder circuitry 72, for performing additive and subtractive operations. In this example, adder circuitry 72 includes a sequence of an aligner, an adder, a LEO (left end out) shifter, normalization circuitry and rounding circuitry; of course, as in the case of multiplication circuitry 70, other conventional implementations of floating-point additive circuitry may be utilized. Also as in the case of multiplication circuitry 70, the execution of an instruction by adder circuitry 72 may take three machine cycles, and as such adder circuitry 70 may be implemented as three stages, each controlled by a corresponding stage in control pipeline 66.

The third path of execution circuitry 65 is a single-cycle execution unit 68, by way of which special single-cycle floating-point instructions may be executed. Examples of such single-cycle floating-point instructions include floating-point change of sign (FCHS) and floating-point absolute value (FABS). Single-cycle execution unit 68 is implemented by way of the special combinational logic required to perform the desired single-cycle instructions, as known in the art. The output of single-cycle execution unit 68 is also presented to completion unit 75.

Completion unit 75, as noted above, receives the outputs of the three paths (multiplication circuitry 70, adder circuitry 72, and single-cycle execution unit 68) of execution circuitry 65. Completion unit 75 includes such logic as necessary to detect and handle any errors or exceptions encountered in the execution of the instruction. In addition, if shared FPU 5 is capable of out-of-order execution, completion unit 75 will include the necessary logic and local storage to re-order the execution results into program order. Each of these operations are performed in completion stage 49 of floating-point pipeline 40 (see FIG. 2). Completion unit 75 also may reformat the results of the execution, as required, into the appropriate format. The results from completion unit 75 are output to result register 76 which, in turn, drives writeback bus WB at its output.

As shown in FIG. 3, writeback bus WB is coupled to output buffer 78, through which communication of the result of the floating-point operation to memory, via internal bus IBUS, may be effected. Writeback bus WB is also coupled to each of dedicated stacks $60_0$, $60_1$, for register storage of the results. As noted above, shared FPU 5 also provides result forwarding, and as such writeback bus WB is coupled to inputs of multiplexers 58 as a source of input operands for later instructions.

Figure 4:
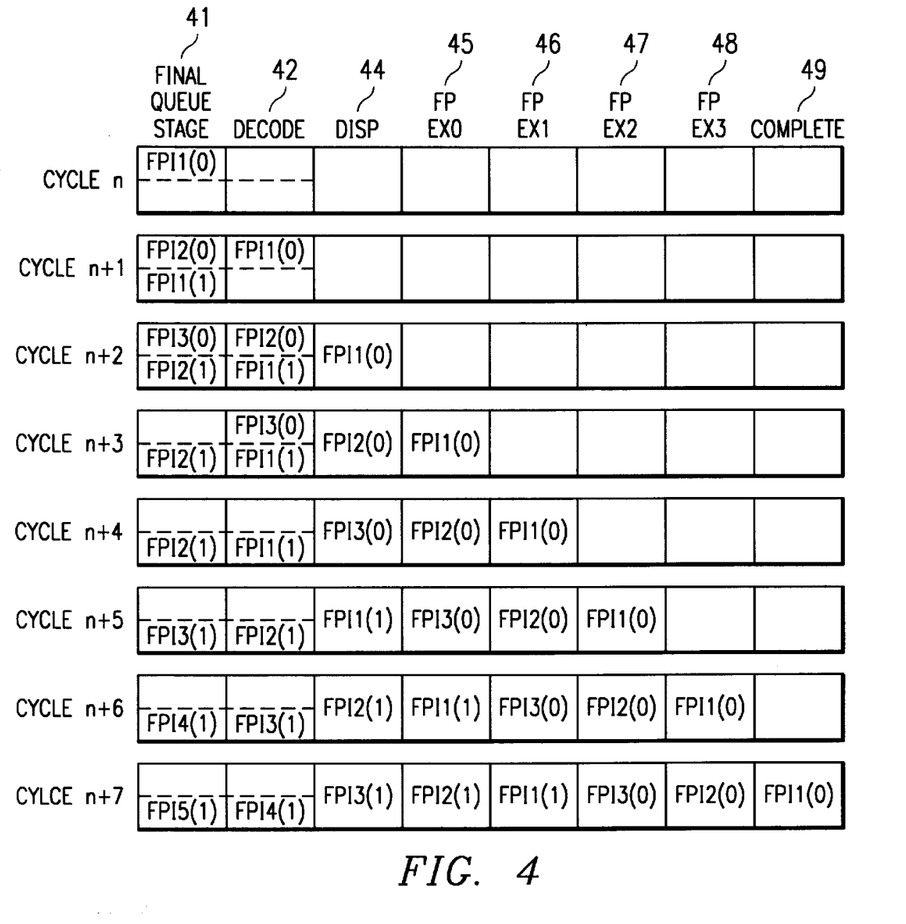
FIG. 4 is a timing diagram illustrating an example of the progression of floating-point instructions through the floating-point unit of FIG. 3.

Referring now to FIG. 4, the operation of shared FPU 5 in executing instructions provided from each of CPUs 10 that share it as a resource will now be described relative to a pipeline diagram for an example of a program sequence. Each row of FIG. 4 corresponds to a machine cycle, while each column of FIG. 4 is a pipeline stage in floating-point pipeline 40 of FIG. 2. In the example of FIG. 4, each of CPUs $10_0$, $10_1$ provides shared FPU 5 with a sequence of floating-point instructions identified as FPIk(0) for instructions from CPU $10_0$ and as FPIk(1) for instructions from CPU $10_1$; the index k indicates the position of the instruction in the sequence, with the first instruction having an index of 1.

In cycle n of this example, the final stage of instruction queue pipeline stage $41_0$ for instructions from CPU $10_0$ contains, in instruction buffer $50_1$, the first instruction FPI1(0). The remainder of the floating-point pipeline stages are empty at this time (presumably because shared FPU 5 has not been utilized for several machine cycles). The final stage of instruction queue pipeline stage $41_1$ for instructions from CPU $10_1$ is also empty in cycle n, as no floating-point instruction forwarded from CPU $10_1$ has yet advanced to this point. Accordingly, in the next cycle n+1, the first instruction FPI1(0) is decoded by floating-point instruction decoder $52_1$ in floating-point instruction decode pipeline stage 42. In this example, a first floating-point instruction FPI1(1) from CPU $10_1$ has advanced to the final stage of instruction queue pipeline stage $41_1$; similarly, the second floating-point instruction FPI2(0) from CPU $10_0$ has advanced into the final stage of instruction queue pipeline stage $41_0$.

In cycle n+2, the first floating-point instruction FPI1(0) is launched by dispatch unit 56 in dispatch stage 44. In this example, the sequence of instructions from each of CPUs $10_0$, $10_1$ continue to advance in the pipeline, with new instructions FPI3(0), FPI2(1) advancing into the final queue stages $41_0$, $41_1$, respectively. As noted above, dispatch stage 44 determines the priority between floating-point instructions decoded by the multiple instruction decoders 52 of shared FPU 5. In the example of FIG. 4, no conflict was present because only instruction FPI1(0) was decoded by instruction decoder $52_1$ and presented to dispatch unit 56 in cycle n+1, and thus instruction FPI1(0) can be issued in cycle n+2 (assuming no exceptions or other faults).

Execution of instruction FPI1(0) thus begins in cycle n+3, in stage 45. In the immediately previous cycle n+2, however, instruction decoders $52_0$, $52_1$ have decoded floating-point instructions FPI2(0), FPI1(1), respectively. Accordingly, a conflict is present at dispatch stage 44 in cycle n+3. In this example, dispatch unit 56 resolves the conflict by selecting the second instruction FPI2(0) from CPU $10_0$ for processing in dispatch stage 44 in cycle n+3, as it is the next instruction in the sequence of the instruction FPI1(0) that was launched in the previous cycle. Accordingly, the sequence of instructions from CPU $10_1$ stalls, and instruction FPI1(1) remains in decode stage 42 until the sequence of instructions from CPU $10_0$ is either complete or reaches a point at which instructions from CPU $10_1$ may be processed by shared FPU 5.

In the example of FIG. 4, the sequence of floating-point instructions from CPU $10_0$ is three instructions long. In cycle n+3, therefore, instruction FPU3(0) has reached decode stage $42_0$, but the final queue stage $41_0$ is empty. According to this embodiment of the invention, therefore, the sequence of instructions FPI1(0) through FPI3(0) is processed in sequence until cycle n+5, at which time no conflict remains at dispatch stage 44. In cycle n+5, the first instruction in the sequence from CPU $10_1$ is launched, and the sequence of instructions being executed by shared FPU 5 thus begins to include the instructions from CPU $10_1$. As shown in FIG. 4, therefore, particularly in cycles n+7 and n+8, shared FPU 5 is able to include, in its pipeline, instructions from multiple CPUs 10.

According to the preferred embodiment of the invention, therefore, multiple floating-point sequences may be executed by shared FPU 5. It is contemplated, based on analysis done in connection with the present invention, that the degree of sharing (i.e., the number of CPUs sharing a single FPU) will be selected by way of a tradeoff between chip area saved and performance loss due to conflicts. Given the frequency of FPU use by conventional processors, it is contemplated that 2:1 or 3:1 sharing ratios will not result in frequent conflicts. Even in the event of a conflict, however, it is also contemplated that the wait time required of the CPUs may be minimized by allowing portions of floating-point sequences to be interleaved. Given the tremendous savings in chip area that may be obtained in the sharing of floating-point units, however, it is expected that the present invention will be extremely beneficial in the implementation of single-chip multiprocessors.

Figure 5:
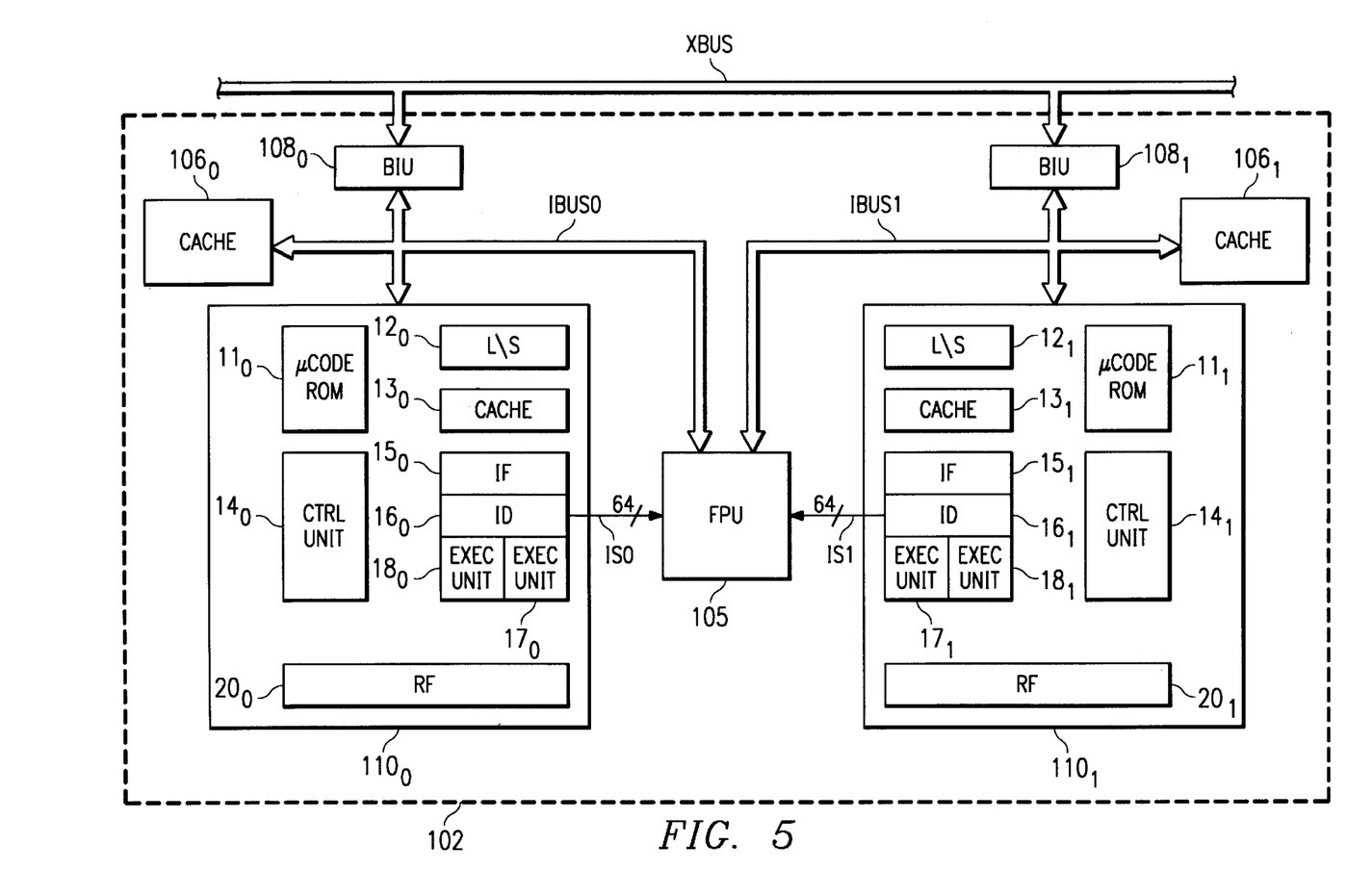
FIG. 5 is an electrical diagram, in block form, of a single-chip multiprocessor according to a second preferred embodiment of the invention.
Figure 6:
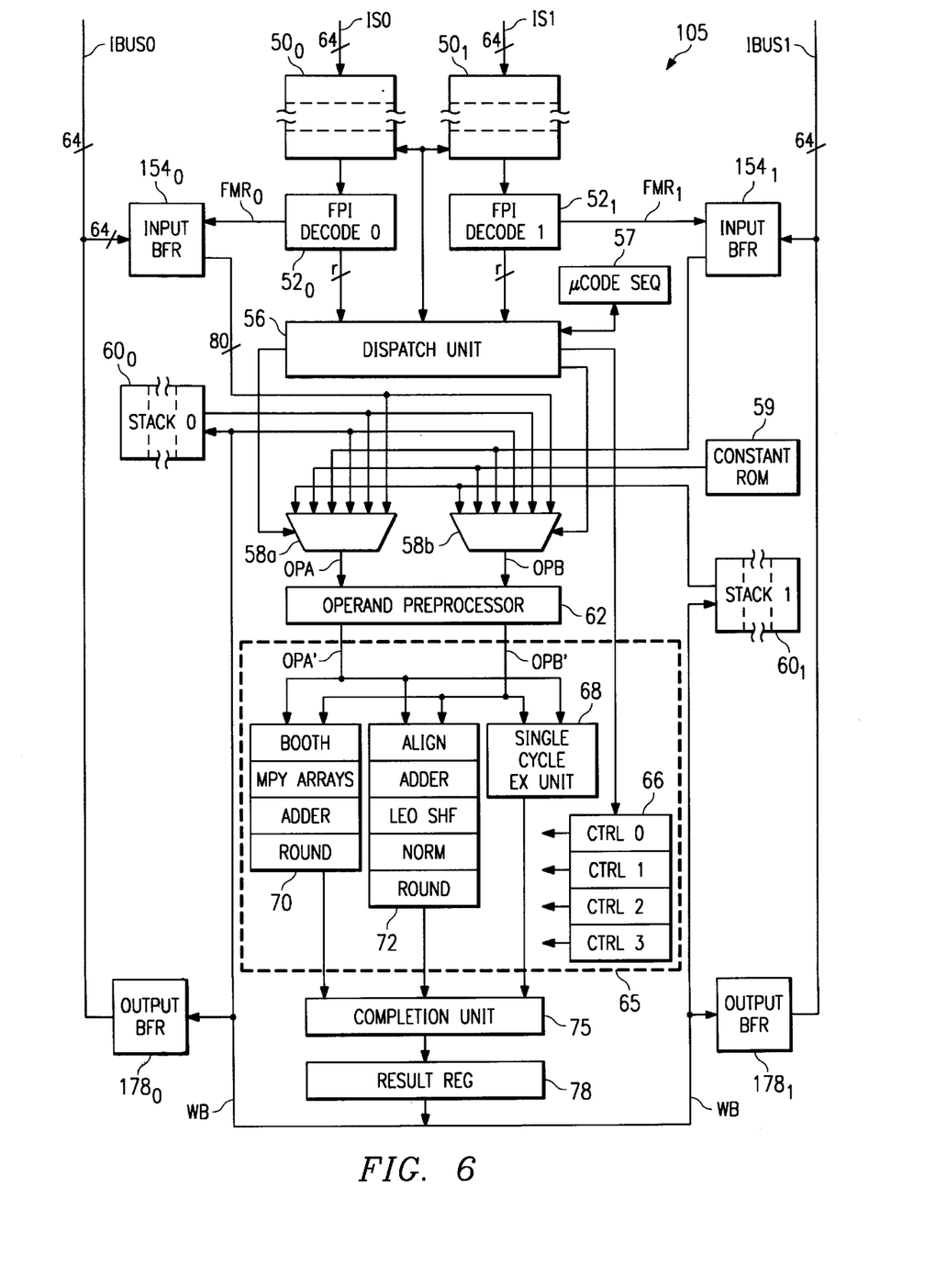
FIG. 6 is an electrical diagram, in block form, of a shared floating-point unit as incorporated into the multiprocessor of FIG. 5.

Referring now to FIGS. 5 and 6, the implementation of multiprocessor 102 according to a second embodiment of the invention will now be described. Like elements in FIGS. 5 and 6 to those in FIGS. 1 and 3 will be referred to by way of the same reference numerals.

Multiprocessor 102 is a single-chip multiprocessor having two CPUs 110$_0$, 110$_1$ implemented therewithin; as described above relative to FIG. 2, more than two CPUs may be implemented in multiprocessor 102 according to this embodiment of the invention, if desired. The degree of resource sharing exhibited by CPUs 110 in multiprocessor 102 is much less than that in multiprocessor 2 described hereinabove. As illustrated in FIG. 5, CPU 110$_0$ is in communication with internal bus IBUS0, which is dedicated to CPU 110$_0$ and which is coupled to external bus XBUS via dedicated BIU 108$_0$. Similarly, CPU 110$_1$ is in communication with its own dedicated internal bus IBUS1, which is coupled to external bus XBUS via dedicated BIU 108$_1$. Each of CPUs 110$_0$, 110$_1$ is also coupled to dedicated cache memory 106$_0$, 106$_1$, respectively.

BIUs 108$_0$, 108$_1$ each operate as a full bus interface unit for a microprocessor, and as such control and effect the communication of data, address, and control signals between internal buses IBUS0, IBUS1, respectively, and external bus XBUS. BIUs 108 each access external bus XBUS as separate bus masters.

According to this embodiment of the invention, CPUs 110 are illustrated as having similar construction as CPUs 10 described hereinabove. As described hereinabove, however, the internal construction of CPUs 10 may be according to other known arrangements for microprocessor CPUs. For example, CPUs 110 may be scalar microprocessors, or superscalar microprocessors to a higher degree than two (e.g., having four integer pipelines). Other alternative implementations for CPUs 110 may thus be utilized in connection with the present invention.

According to this second embodiment of the invention, shared FPU 105 not only receives instruction streams from CPUs 110 via buses IS0, IS1, as before, but also communicates data with CPUs 110$_0$, 110$_1$ via internal buses IBUS0, IBUS1, respectively. Referring now to FIG. 6, the construction of shared FPU 105 according to this embodiment of the invention will now be described in detail.

Shared FPU 105 according to this embodiment of the invention is similarly constructed relative to its dispatch unit 56 and execution circuitry 65 as described hereinabove. Also as described above, dedicated instruction buffers 52, floating-point instruction decoders 52, and stacks 60 are provided within shared FPU 105 for each CPU 110 having access thereto. As such, the pipelined operation of shared FPU 105 according to this second embodiment of the invention is quite similar to that described hereinabove relative to FIGS. 2 and 4. According to this embodiment of the invention, however, additional circuitry is provided to communicate with both of internal buses IBUS0, IBUS1.

Internal bus IBUS0 is coupled to input buffer 154$_0$, which receives floating-point operands therefrom. Floating-point instruction decoder 52$_0$, which decodes floating-point instructions presented by CPU 110$_0$, controls input buffer 154$_0$ to enable the receipt of extended precision floating-point operands (having, for example, eighty bits) from the smaller sixty-four bit internal bus IBUS0. The output of input buffer 154$_0$ is presented to inputs of both of multiplexers 58a, 58b to communicate floating-point operands retrieved from memory by CPU 110$_0$. Also on this side of shared FPU 105, output buffer 178$_0$ receives the contents of writeback bus WB and presents its contents to internal bus IBUS0, for communication back to CPU 110$_0$. As indicated by FIG. 5, no communication to CPU 110$_1$ can be effected by internal bus IBUS0.

Shared FPU 105 is in communication with CPU 110$_1$ via internal bus IBUS1, as shown in FIG. 5. In symmetric fashion relative to internal bus IBUS0, internal bus IBUS1 is received by input buffer 154$_1$, which presents its output to inputs of each of multiplexers 58a, 58b; floating-point instruction decoder 52$_1$ controls multiple-cycle receipt of floating-point operands by way of a control signal on line FMR$_1$. On the output side, output buffer 178$_1$ is connected to writeback buffer WB to receive results therefrom, and to communicate these results to CPU 110$_1$ via internal bus IBUS1 for receipt by CPU 110$_1$.

Comparison of this second embodiment of FIGS. 5 and 6 with the first embodiment of FIGS. 1 and 3 shows that the present invention is applicable to single-chip multiprocessors of various architectures regarding the extent to which the multiple CPUs share resources such as bus interface units, caches, internal buses, and the like. As repeatedly noted hereinabove, the particular architecture of the sharing CPUs in the multiprocessor can be quite varied, and may be of the CISC (e.g., x86 architecture) or RISC type. In addition, the way in which instructions are decoded and issued by the shared FPU may also be implemented in alternative ways; for example, the integer pipelines may decode the floating-point instructions into so-called atomic operations (in the RISC sense) and the atomic operations may then be forwarded to the shared FPU for issuing to the execution circuitry.

According to the present invention, therefore, important advantages in the design and implementation of single-chip multiprocessors may be obtained. The relatively low utilization of conventional on-chip floating-point units is used to advantage in the present invention, by the sharing of the on-chip floating-point unit by multiple integer CPUs in the multiprocessor. Significant chip area is thus saved according to this arrangement, especially when compared against the alternative of providing a floating-point unit for each integer CPU.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A multiprocessor implemented on a single integrated circuit, comprising:

a plurality of central processing units for executing program instructions upon integer data, each of the plurality of central processing units including an instruction decoder capable of detecting floating-point program instructions corresponding to program instructions to be executed upon floating-point operands;

an internal bus system, for communicating data to and from the plurality of central processing units; and a single floating-point unit shared by the plurality of central processing units, coupled to each of the plurality of central processing units to receive therefrom detected floating-point instructions, and coupled to the internal bus system for receiving floating-point operands therefrom and communicating floating-point results thereto, the single floating-point unit including a plurality of floating-point instruction buffers, each floating-point instruction buffer receiving detected floating-point instructions from a corresponding one of the plurality of central processing units, being capable of storing a plurality of floating-point instructions and forwarding the received floating-point instructions in sequence;

a plurality of floating-point instruction decoders, each floating-point instruction decoder receiving floating-point instructions forwarded by a corresponding one of the plurality of floating-point instruction buffers and decoding the forwarded floating-point instructions;

a single floating-point execution unit for performing floating-point arithmetic operations upon floating-point operands received from the internal bus system according to the decoded floating-point instructions;

a single dispatch unit connected to each of said plurality of floating-point instruction decoders and the single floating-point execution unit for controlling the single floating-point execution unit to execute a decoded floating-point instruction from a selected one of the plurality of floating-point instruction decoders.

2. The multiprocessor of claim 1, further comprising:

a plurality of register banks, each coupled to inputs of the single floating-point execution unit and to an output of the single floating-point execution unit, and each associated with one of the plurality of central processing units, for presenting and storing floating-point operands to and from the single floating-point execution unit for floating-point instructions detected by the associated one of the plurality of central processing units.

3. The multiprocessor of claim 2, wherein each of the plurality of register banks comprises a plurality of registers arranged as a stack.

4. The multiprocessor of claim 1, wherein:

the single floating-point execution unit is constructed in a pipeline fashion capable of performing different portions of plural floating-point instructions simultaneously and sequentially over plural instruction cycles, the single floating-point execution unit employing a maximum of N instruction cycles; and each of the plurality of floating-point instruction buffers capable of storing N+1 floating-point instructions.

5. The multiprocessor of claim 1, wherein:

each of the plurality of central processing units includes a plurality of integer execution units, only a predetermined one of the plurality of integer execution units capable of forwarding detected floating-point instructions to the single floating-point unit.

* * * * *